United States Patent [19]

Blok

[11] 4,439,320
[45] * Mar. 27, 1984

[54] SOLIDS CONCENTRATOR

[76] Inventor: Arie Blok, 1422 Overlea Dr., Dunedin, Fla. 33528

[*] Notice: The portion of the term of this patent subsequent to Dec. 13, 1994 has been disclaimed.

[21] Appl. No.: 278,063

[22] Filed: Jun. 29, 1981

Related U.S. Application Data

[63] Continuation of Ser. No. 858,775, Dec. 8, 1977, abandoned, Continuation-in-part of Ser. No. 703,126, Jul. 7, 1976, Pat. No. 4,062,776.

[51] Int. Cl.³ .............................................. B01D 33/10
[52] U.S. Cl. .................................... 210/394; 210/403; 210/411
[58] Field of Search ............... 210/402, 403, 393, 411, 210/394, 236, 415, 780, 784

[56] References Cited

U.S. PATENT DOCUMENTS

| | | | |
|---|---|---|---|
| 1,054,323 | 2/1913 | Steele | 210/403 |
| 2,295,937 | 9/1942 | Crane et al. | 210/403 |
| 2,750,855 | 6/1956 | Lathrop | 210/403 |
| 3,193,927 | 7/1965 | Ubbels et al. | 210/403 |
| 3,401,801 | 9/1968 | Wedemeyer et al. | 210/394 |
| 3,695,448 | 10/1972 | Johansson | 210/403 |
| 3,739,915 | 6/1973 | Kehoe et al. | 210/394 |
| 3,747,770 | 7/1973 | Zentis | 210/402 |
| 3,777,658 | 12/1973 | Vosskuhler | 210/415 |
| 4,062,776 | 12/1977 | Blok | 210/403 |

Primary Examiner—Benoît Castel
Attorney, Agent, or Firm—Charles E. Brown

[57] ABSTRACT

Apparatus for concentrating solids from a solids/liquid mixture, particularly sludge from a waste stream/flocculating polymer mixture, includes a frusto-conically shaped drum. A solids/liquid mixture is introduced through a conduit into a large end of the rotary driven conical drum. A maximum amount of the free liquid in the mixture is released from the drum through its screen side wall near the large entrance end of the drum. The solids in the drum, after initial release of the liquid therefrom, are moved during their travel to the smaller exit end of the drum where the surface movement of the drum is slower. The resulting thickened or dewatered solids are removed from the smaller end of the drum as a formed cake or in the form of thickened sludge.

4 Claims, 10 Drawing Figures

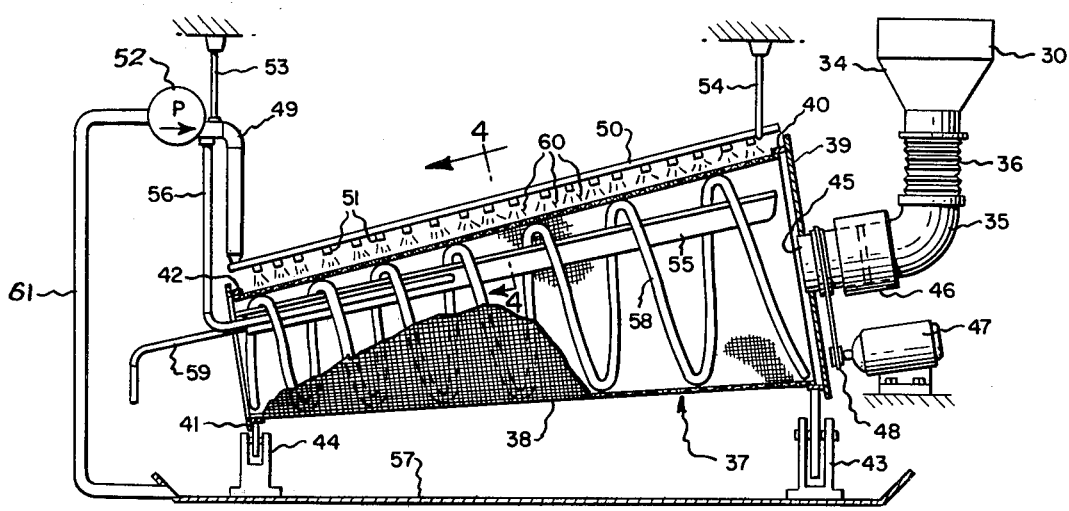
Fig. 1.
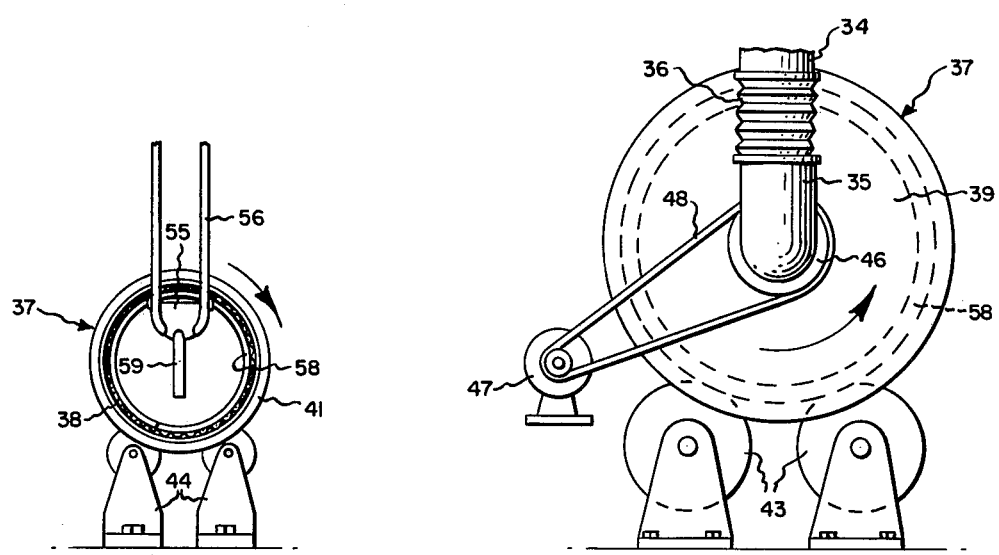
Fig. 3.
Fig. 2.
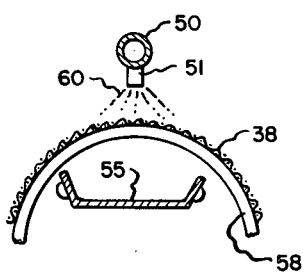
Fig. 4.

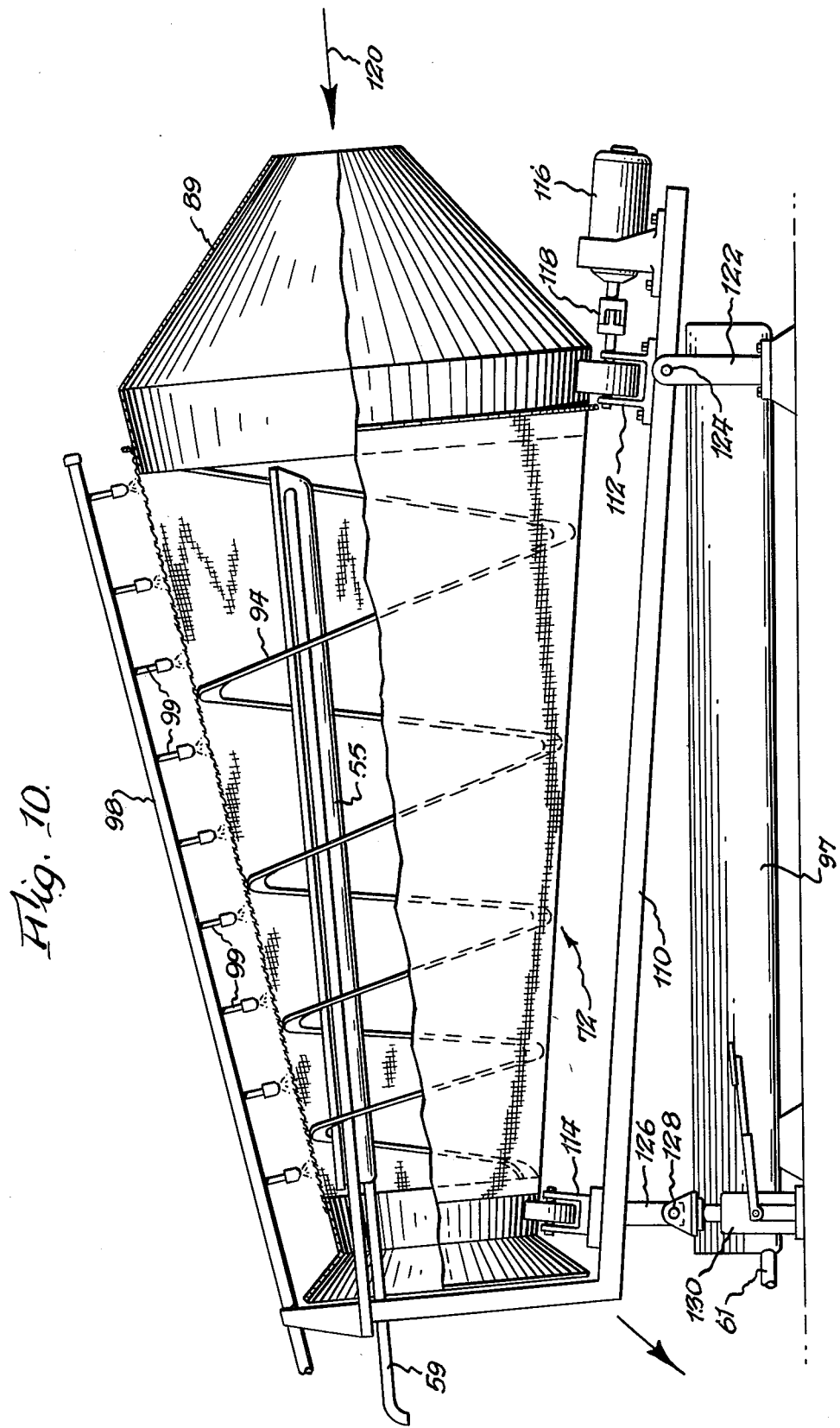

SOLIDS CONCENTRATOR

This is a continuation of application Ser. No. 858,775 filed Dec. 8, 1977, now abandoned, which is a continuation in part of Ser. No. 703,126 filed July 7, 1976 and now U.S. Pat. No. 4,062,776.

SUMMARY OF THE INVENTION

A solids concentrator comprising a frusto-conical drum includes a side wall screen and has a large inlet end and a smaller open outlet end, means are mounted at the inlet end for introducing a mixture of solids and liquid into the large inlet end, and means are provided for imparting rotation to the drum for conveying the solids toward the open outlet end thereof as the liquid escapes through the screen.

The solids concentrator is further characterized in that the frusto-conical drum includes a series of spaced elongated frame members extending lengthwise of the drum, the side wall screen is comprised of a series of separate foraminous screen portions, and means are provided for fastening each of the screen portions between respective pairs of the series of spaced elongated frame members.

A primary object of the present invention is to provide apparatus capable of producing dewatered or deliquified solids having a moisture content substantially less than dewatered solids produced with currently employed apparatus.

Another object of the invention is to provide an apparatus having a rotary driven drum to receive a sludge/polymer mixture from which free water is separated quickly from the solids or flocs, and in which the flocs are retained for a sufficient amount of time to produce a thickened or dewatered sludge.

Various other objects and advantages of the invention will hereinafter become more fully apparent from the following description illustrating presently preferred embodiments thereof.

BRIEF DESCRIPTION OF THE DRAWINGS

FIG. 1 is a fragmentary side elevational view of one form of rotary drum or solids concentrator constructed in accordance with the invention.

FIG. 2 is an enlarged end elevational view of the larger end of the rotary drum including certain of the parts associated therewith.

FIG. 3 is an end view of the smaller outlet end of the rotary drum.

FIG. 4 is an enlarged fragmentary sectional view taken substantially along a plane indicated by the line 4—4 of FIG. 1.

FIG. 5 is a perspective view of a rotary drum disposed within a rectangular housing.

FIG. 6 is a sectional view, taken on line 6—6 of FIG. 5.

FIG. 7 is an end view of the inlet end of the rotary drum, taken on line 7—7 of FIG. 6.

FIG. 8 is a sectional view, taken on line 8—8 of FIG. 6.

FIG. 9 is an enlarged fragmentary view showing a connection of adjacent screen portions to longitudinally extending frame members, and is taken on line 9—9 of FIG. 6.

FIG. 10 is a fragmentary, side elevational view, partly in section and illustrates the rotary drum mounted upon a pivotable frame member.

DESCRIPTION OF THE PREFERRED EMBODIMENTS

Referring to FIG. 1, a solids concentrator in the form of a conical shaped drum is generally indicated by the numeral 37. A funnel 30 having a hollow conical portion 34 is positioned to receive, e.g., a sludge and flocculating polymer mixture or any other solids and liquid mixture, and has its outlet end connected to one end of an elbow 35 by a flexible hose 36.

The concentrator drum 37 comprises a frusto-conical drum having a side wall screen 38 formed of mesh wire fabric or woven cloth of plastic or the like, an end wall 39 connected to a large end of the screen 38 by an annular surrounding flange 40, and a ring 41 connected to the smaller discharge end of the screen 38 by a surrounding flange 42. The concentrator drum 37 is supported for rotation by a pair of wheel units 43 which engage the flange 40, and a pair of wheel units 44 on which the flange 41 rides.

A rigid tube 45 extends centrally through and is secured in the end wall 39 and has its outer inlet end connected by a water-tight rotary coupling 46 to the other end of the elbow 35. A variable speed electric motor 47 drives the drum 37 through a belt and pulley drive 48, one pulley of which is secured around the tube 45 between the wall 39 and coupling 46.

A conduit 49 has a discharge end terminating in a manifold 50 which is disposed above, adjacent to and substantially parallel to the conical screen 38 and is equipped with nozzles 51 which are positioned to discharge a liquid spray 60 toward the top-most portion of the screen 38 from end to end thereof. A pump 52 is interposed in the conduit 49 to supply liquid under pressure to the nozzles 51; the liquid may be plain water or the pump 52 may draw liquid through a pipe 61 from a sump 57 which catches liquid as it drains through screen 38. A hanger 57 supports the conduit 49 and a hanger 54 supports the manifold 50 at the end thereof remote from the conduit 49.

A pan 55 is disposed in the upper part of the concentrator drum 37 beneath and adjacent to the nozzles 51. A bracket 56 which is suspended from the conduit 49 has end portions extending into the drum 37 through its open ring 41 and which embrace and are secured to the side walls of the pan 55. A drain pipe 59 extends outwardly through ring 41 at the open lower end of the drum 37 and leads from the lower end of the pan 55.

A helical vane 58 is secured within the screen drum 37 and extends from end to end thereof. The spacing or pitch between the convolutions of the vane 58 diminishes from the large end to the restricted end of the drum.

The residue from a waste water treatment plant usually contains less than 1% of small or fine particles which cannot be removed with a sieve or screen. This residue or sludge is mixed with a flocculating polymer and the polymer draws these fine particles together. It is essential that the polymer be added to the sludge as fast as possible initially. Thereafter, the mixing action must be slowed down to build up the flocs which will be destroyed unless the mixing action is slowed down sufficiently. The flocs which are strong enough to be pressed, such as in a sludge press, are referred to as "sturdy flocs".

In operation, a desired sludge/polymer mixture, or other solids/liquid mixture, is introduced into the funnel 30 and passes through the conduit 36, elbow 35, coupling 46, and rigid tube 45 into the large end of the concentrator drum 37. This large end has the maximum surface area of the screen 38, so that the free water, constituting more than 99% of the mixture, can readily escape from the drum 37 into the sump 57. The helical vane 58 divides the drum 37 into compartments which diminish in length from the larger to the smaller end of the drum and which control and restrict movement of the sludge to the discharge end adjacent ring 41, to permit a maximum amount of water or liquid to escape through the screen 38. The surface speed of drum 37 will diminish as the flocs move toward the discharge end thereby affording protection to the flocs or other solids. Certain sludges will release their water more rapidly than others and for this reason the speed of rotation of the drum 37 may be varied by the motor 47.

The filtrate from the concentrator drum 37 which is collected in the sump 57 may be partially supplied to the nozzles 51 by the conduit 49 and pump 52 and is sprayed in the form of jets 60 onto the top of the screen 38 for cleaning the screen as it revolves. The water from the nozzles 51 is collected in the pan 55 and may be conveyed by the drain pipe 59 to a sewage treatment plant, together with the remainder of the filtrate from the pump 57, or may be pumped into funnel 30 to be recirculated through the drum 37.

When the apparatus is used for waste water or sewage treatment, the flocs are removed as formed cake or thickened sludge from the small end of the concentrator drum 37 through ring 41 and may be transported to a digestor, truck, container or for further processing in additional dewatering equipment such as drain bags, or sludge presses, etc.

FIGS. 5-9 illustrate a modified form of solids concentrator, generally indicated by the numeral 70. A frusto-conical drum, generally indicated by the numeral 72, is preferably disposed within a rectangular housing 74, which housing 74 preferably includes at least one removable panel 75 for maintenance and inspection purposes.

Drum 72 includes a series of spaced, elongated frame members 76 which extend lengthwise of the drum 72 and are supported by a large annular ring 77 and a small annular ring 78 which define an inlet end and an outlet end of the drum 72, respectively. As is best shown in FIG. 9, each frame member 76 is comprised of a central support bar 79 and a pair of clamping bars 80 which, along with a series of nuts 81 and bolts 82 are used to clamp together adjacent marginal edge portions 83 of a series of separate foraminous screen portions 84, which screen portions 84 together comprise a side wall screen 85 of frusto-conical drum 72. Screen portions 84 may be formed of mesh wire fabric or woven cloth of textile material or plastics and, preferably, are comprised of woven fabric formed of organic polymeric material the denier and gauge of which may be varied depending upon the types of solids and liquids which are being separated.

As is best shown in FIGS. 6 and 7, drum 72 is supported for rotation by a set of wheel units 86 at an inlet end thereof and a corresponding set of wheel units 87 at an outlet end thereof. A support ring or race member 88 is supported upon wheel units 86 and is affixed to a hollow, frusto-conical feed member 89 which has an inlet 90 at its smaller end and has its larger end fixedly secured or integral with the large annular ring 77 which forms part of the drum 72. Hollow feed member 89 also has a sprocket member 91 attached thereto and which cooperates with a variable speed motor 92 and a drive gear 93. Thus, operation of the motor 92 will rotate the hollow feed member 89 along with the attached drum 72 so that the drum rotates about its central axis on wheel units 86 and 87. As solids and liquids are introduced into inlet 90, the mixture is allowed to slide down the lowermost surface of the frusto-conical feed member 89 so as to provide gentle handling of the flocs created by mixing polymer flocculants into the mixture.

Frusto-conical drum 72 contains a spiral vane 94 which is in the form of a converging helix having a large end 95 adjacent the inlet end and a small end 96 adjacent the outlet end of the drum and, as best shown in FIG. 6, spiral vane 94 has a decreasing diameter and a decreasing pitch or spacing between adjacent flights as the spiral vane extends from the inlet end toward the outlet end of the drum 72. Spiral vane 94 is affixed to and rotates with the drum 72 such that rotation of the drum 72 causes solids contained therein to be moved gradually upwardly toward the outlet end adjacent annular ring 78.

It will be apparent that, in operation, variable speed motor 92 gives good control over the speed of solids traveling through the drum, that the decreasing pitch of spiral vane 94 slows down the incremental advance of the solids for any given speed of rotation of the drum 72, and that the frusto-conical shape of drum 72 provides a large surface area near the inlet end which allows most of the liquid to escape at the inlet end of the drum. Concurrently, the small end of the frusto-conical drum 72 has a lower surface speed than the large end thus providing for gentle handling of the solids and, in combination with the decreased pitch of spiral vane 94 allows for slow travel of the solids thereby allowing additional time for the solids to drain off excess liquid.

The solids concentrator 70 is provided with a sump 97 for collecting liquid as it drains through the drum 72 and also includes screen cleaning equipment including a liquid spray pipe 98 having a series of nozzles 99 which are provided with cleansing liquid in the same manner as is shown in FIG. 1, including conduit 49, pump 52, pipe 61, as well as drain pan 55 and drain pipe 59.

FIG. 10 illustrates a modified form of mounting structure for a solids concentrator such as previously described, wherein like numerals are used to designate similar parts. Drum 72 is mounted upon an underlying support frame 110 by separate pairs of wheel units 112 and 114 at the respective inlet and outlet ends of the drum 72. A modified form of drive mechanism is provided by a variable speed motor 116 which is connected by a coupling 118 to one of the wheels of wheel unit 112 for providing a direct drive to the drum 72 for rotation about its central axis indicated by the arrow 120.

Support frame 110 is supported by a pair of spaced trunions 122, one disposed on each side of the underlying sump 97, the trunions 122 supporting the support frame 110 by a pivot 124. The end of support frame 110 adjacent to the exit end of drum 72 is provided with a support member 126 having a pivotal connection 128 and supported by an extensible lift mechanism or jack 130. Jack 130 is operable for moving the support frame 110 and drum 72 upwardly or downwardly about pivot 124 so as to vary the orientation of central axis 120. In this manner, the axis of drum 72 can be placed in the most advantageous orientation, either inclined up or down relative to the horizontal. It is to be understood that the frame member 110 may also be used in the embodiment of FIGS. 5-9 so that the frame member 110 underlies and supports the wheel units 86 and 87, as shown in FIG. 6. Of course, sufficient clearance between the drum 72 and the housing 74 must be provided.

While the invention has been described herein with references to various preferred embodiments, it is to be understood that various changes and modifications may be made by those skilled in the art without departing from the spirit and scope of the invention as defined in the following claimed subject matter.

I claim:

1. A solids concentrator comprising a frusto-conical drum including a foraminous side wall screen and having a large inlet end and a smaller open outlet end, said frusto-conical drum including a series of spaced elongated frame members extending lengthwise of said drum externally of said side wall screen, said side wall screen being comprised of a series of separate screen portions, and means for fastening each of said screen portions between respective pairs of said series of spaced elongated frame members, each of said frame members including a bar portion lying in a radial plane, and said screen portions each having a free edge portion clamped to a radially extending face of a respective bar portion, said screen having a straight line taper from said large inlet end to said smaller open outlet end, means for introducing a mixture of solids and liquid into said inlet end, means for rotating said drum, and conveying means disposed within said drum for conveying the solids toward said open outlet end thereof as the liquid escapes through said screen, said conveying means comprising a spiral vane fixedly disposed within said drum along and closely adjacent an inner periphery of said foraminous side wall for constantly urging liquid through said side wall, said spiral vane being in the form of a helix having a large diameter end adjacent said inlet end and a small diameter end adjacent said outlet end, said spiral vane having a constant taper corresponding to that of said side wall screen and a decreasing pitch and diameter as said vane extends from said large inlet end toward said smaller outlet end, said solids concentrator further including spraying means for spraying a cleansing liquid along a top portion of said side wall screen for constantly cleansing said side wall screen, and a pan contained within said screen for receiving the cleansing liquid and foreign matter carried thereby and discharging said cleansing liquid and foreign matter separately from said drum, a sump disposed beneath said drum for collecting liquid draining through said side wall screen, and means for drawing liquid from said sump and for supplying it under pressure to said spraying means.

2. A solids concentrator as defined in claim 1 including means for supporting said side wall screen for rotation with the lowermost part of said side wall screen being at a downward incline from its inlet end to its outlet end.

3. A solids concentrator as defined in claim 1 including a hollow feed member frusto-conical in shape and having a large end thereof connected to said large inlet end of said drum and a small inlet opening, the shape of said hollow feed member providing for gentle introduction of said mixture of solids and liquid into said drum, and said means for rotating said drum including drive means connected to said hollow feed member adjacent said small end of said hollow feed member for rotating said hollow feed member and said drum.

4. A solids concentrator as defined in claim 1 including a support frame, means mounting said drum on said support frame, pivot means adjacent one end portion of said support frame, and lift means adjacent another portion of said support frame for pivoting said support frame about said pivot means to vary the elevation of said drum inlet end relative to said drum outlet end.

* * * * *